May 30, 1933.  L. C. ALLEN  1,911,984
VERTICAL CONVEYER
Filed March 3, 1930   6 Sheets-Sheet 4
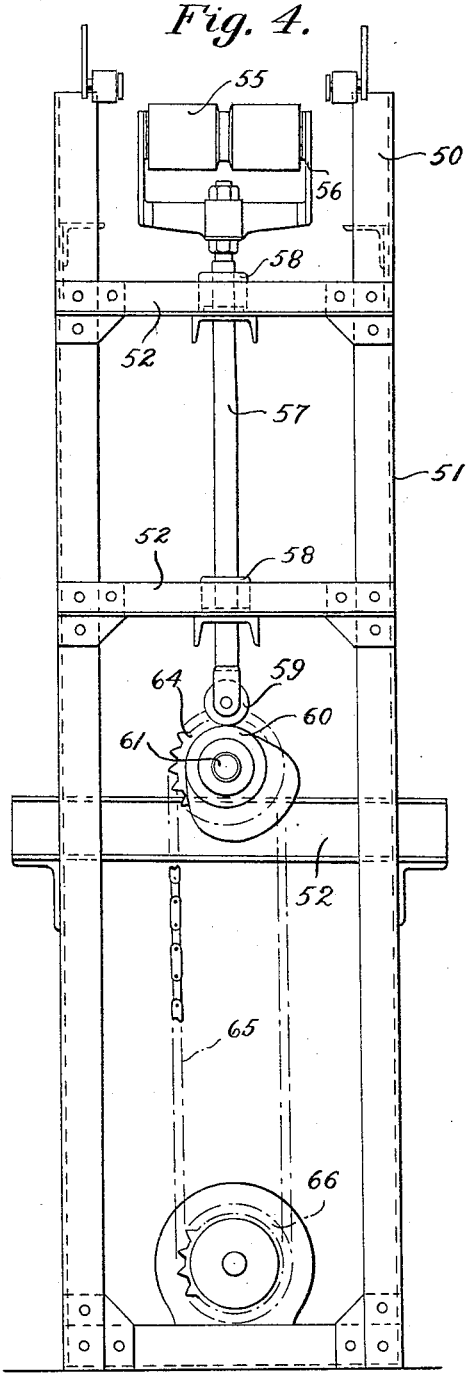
Fig. 4.
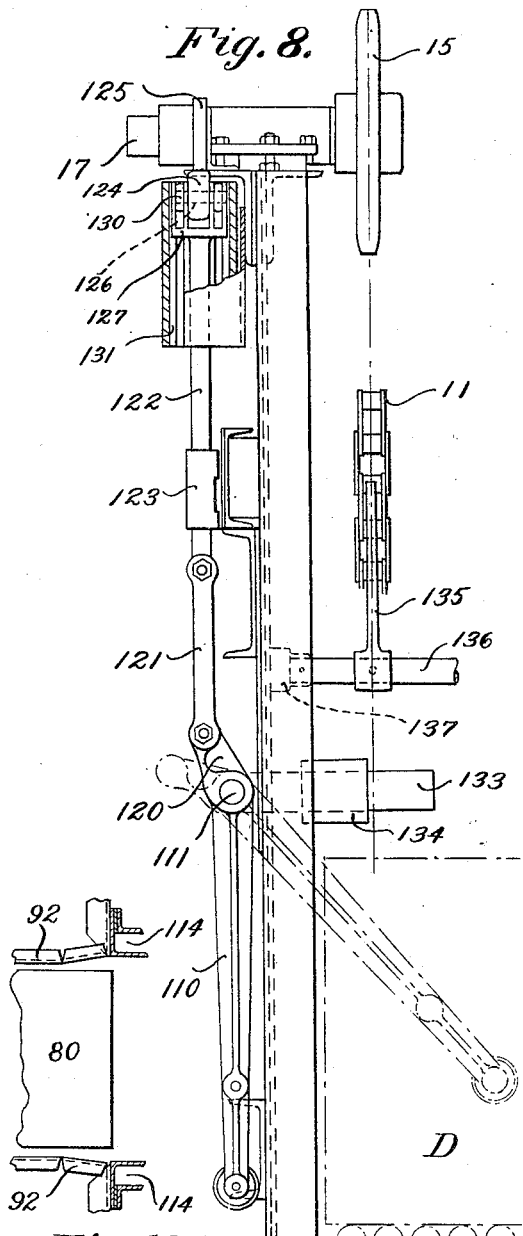
Fig. 8.
Fig. 10.
Inventors.
Lavont C. Allen.
by Robert Cushman Woodbury
Attys.

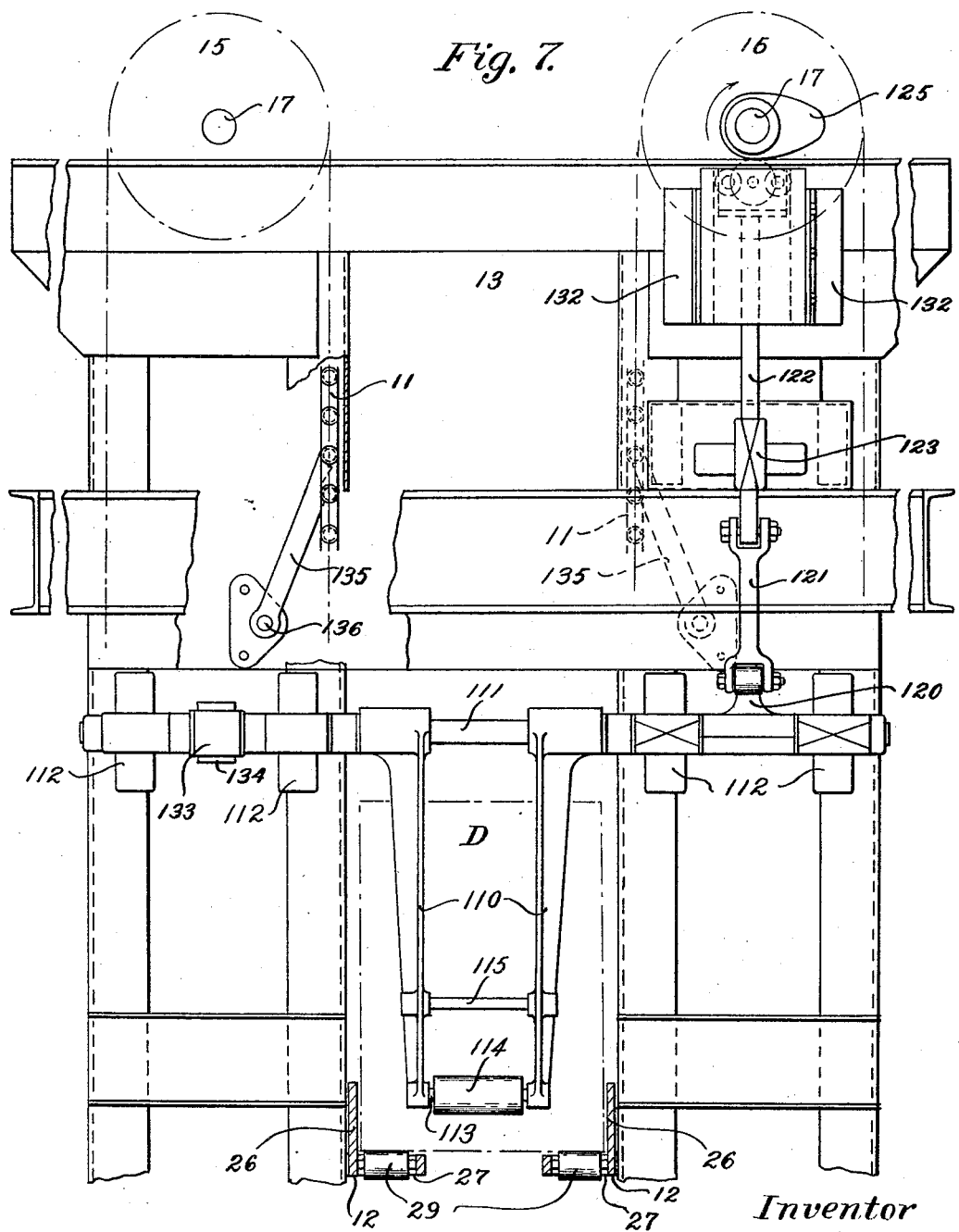

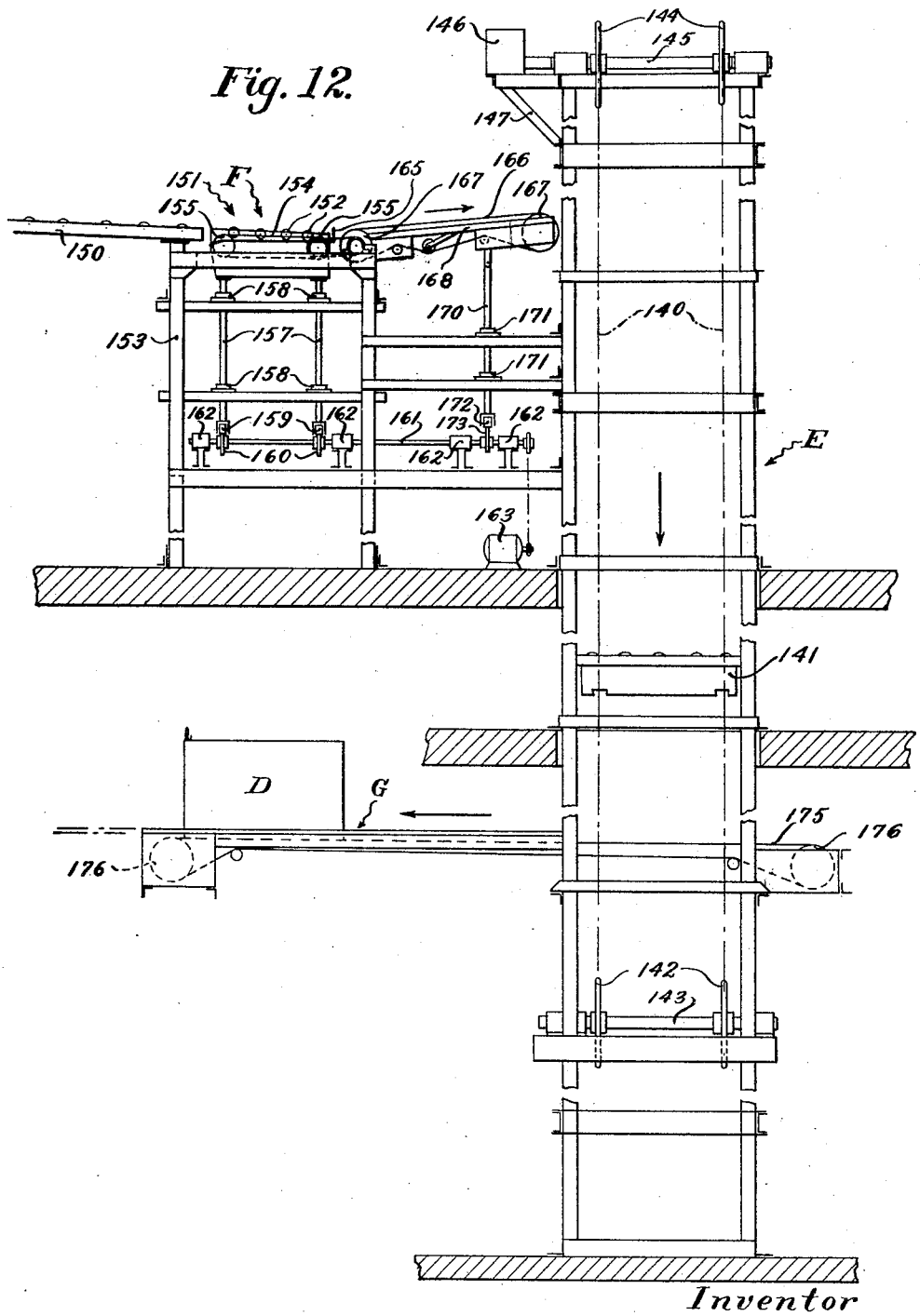

Patented May 30, 1933

1,911,984

UNITED STATES PATENT OFFICE

LAVONT C. ALLEN, OF SYRACUSE, NEW YORK, ASSIGNOR TO THE LAMSON COMPANY, OF SYRACUSE, NEW YORK, A CORPORATION OF MASSACHUSETTS

VERTICAL CONVEYER

Application filed March 3, 1930. Serial No. 432,636.

This invention relates to an improvement in a vertical conveyer and more particularly in a continually moving conveyer in which, while the conveyer is traveling in one direction, the load is supplied thereto at one station and in which, during the further travel of the conveyer in that direction, the load is delivered therefrom, one example of which is shown in the Jennings and Libby application Serial No. 432,666 filed on even date herewith.

One object of this invention is to provide a vertical conveyer comprising belts, chains or similar traveling means on which are supported suitably spaced carriers by which the loads are transported from one station to another during the upward travel of the conveyer in combination with means automatically controlled by the conveyer for supplying a load thereto and means for removing the load from the conveyer to a delivery conveyer the end of which is rigidly fixed against any transverse movement relative to the vertical conveyer.

A further object of the invention is to provide at the loading station, conveyer means for feeding loads into engagement with a stationary stop and supplementary conveyer means for shifting each load individually out of engagement with the stop and advancing it onto a carrier of the vertical conveyer.

A further object of the invention is to provide at the loading station a circuit maker, controlled by a switch which is actuated by each load as it is brought into contact with the stop, in combination with a second circuit maker, controlled by the vertical conveyer, the conjoint operation of both circuit makers setting in motion means by which the load is shifted out of engagement with the stop so that it is advanced into the proper position.

Other objects will appear from a consideration of the following specification and the drawings which form a part thereof and in which Fig. 1 is a front elevation of a vertical conveyer equipped with loading and unloading mechanisms all constructed in accordance with this invention;

Figs. 4 and 5 illustrate details of the loading mechanism;

Fig. 6 is an enlarged front elevation of the delivery conveyer which forms a part of the unloading mechanism;

Fig. 7 is a side elevation of the ejector which forms another part of the unloading mechanism;

Fig. 8 is a rear elevation of the ejector;

Fig. 9 is a sectional view taken along the line 9—9 of Fig. 6;

Fig. 10 is a plan view partially in section taken along the line 10—10 of Fig. 6;

Fig. 11 is a plan view of the ejector operating mechanism; and

Fig. 12 is a view similar to Fig. 1 of another embodiment of this invention.

The apparatus set forth in Figs. 1 to 11 inclusive comprises briefly a vertical conveyer A in combination with loading mechanism at station B and unloading mechanism at station C. The conveyer A travels continually and both the loading and unloading operations take place during its upward movement, no such operations taking place during its downward movement.

Figure 1:
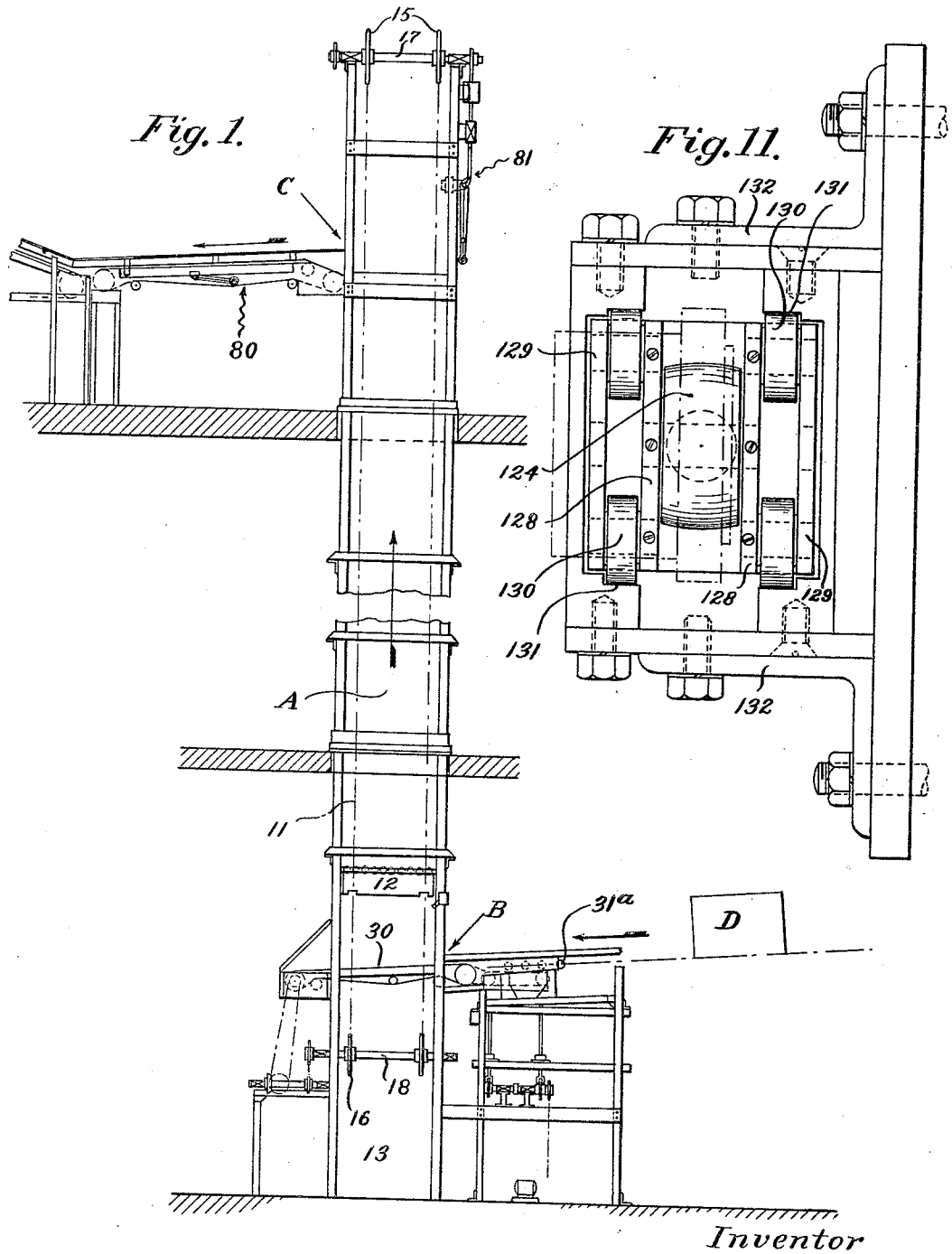

The vertical conveyer A consists of two pairs of chains 11 and carriers 12 which are mounted upon each pair of chains 11. Only one carrier 12 is shown in Fig. 1, but it will be understood that there are a plurality of such carriers mounted upon each pair of chains. The conveyer travels in a well 13 formed of suitable frame members which provide vertically extending parallel guideways 14. The chains 11 are supported upon sprocket wheels 15 and 16 carried upon transversely extending shafts 17 and 18 respectively. The shafts 17 at the top of the well 13 are here shown as driven shafts and the shafts 18 at the bottom of the well as drive shafts operated from any suitable source of power supplied to the stub shaft 19, shown in Fig. 3. On the shaft 19 is mounted a sprocket wheel 20 by which is driven a chain 21 which passes around sprocket wheels 22 on the ends of the shafts 18. The particular manner of driving the shafts 18 forms no part of the present invention and any suitable means for so doing may be employed.

The carriers 12 are formed by flights each of which comprises a transverse rod 25 on which is supported an angle plate consisting of an upright portion 26 and a horizontally extending portion 27. The rods 25 at each end enter the recesses 14 of the well frame and thus the carriers are guided in vertical paths. In the portion 27 on which the loads rest is embedded a series of rollers 29 to eliminate any friction that might occur during the loading or unloading operations. The flights are so spaced upon the chains 11 that, during the upward travel thereof, the flights on one pair of chains are in horizontal planes with the flights on the other pair of chains and thus form carriers in which the loads are supported.

Figure 2:
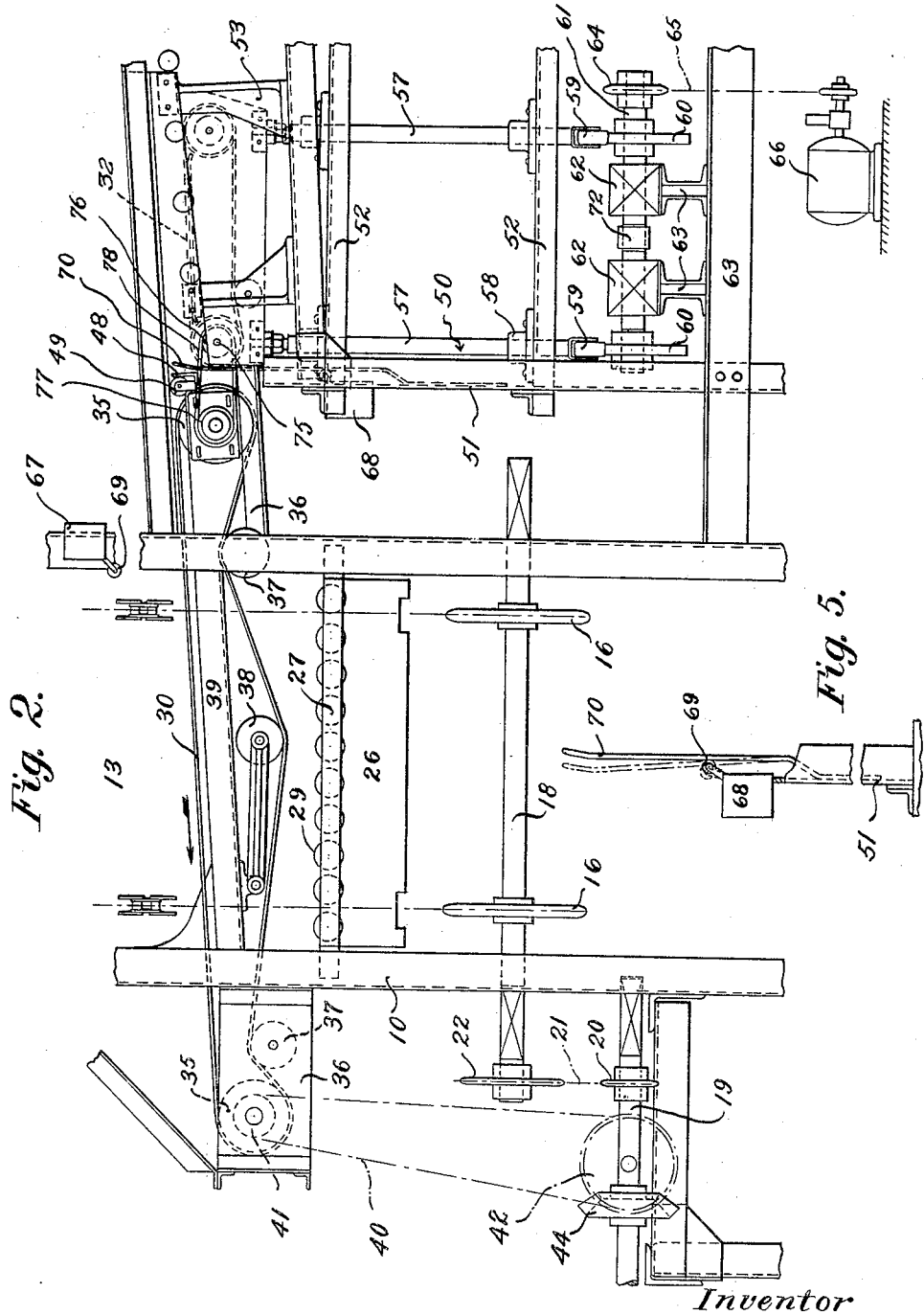
Fig. 2 is an enlarged front elevation of the lower end of the conveyer and of the feeding mechanism associated therewith.
Figure 3:
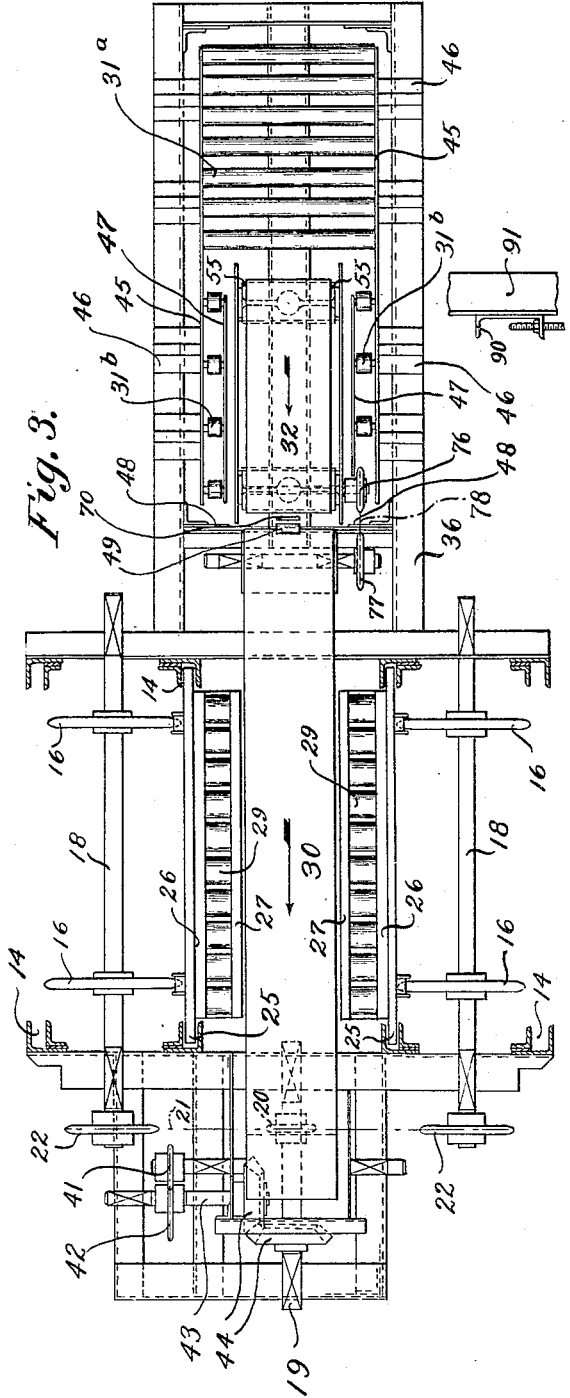
Fig. 3 is a sectional plan view of the mechanism at the loading station.

The loading mechanism at station B comprises a feeding belt 30, a plurality of gravity rolls by which the load is brought to the belt 30, and a lifting or elevating belt 32. The belt 30 is mounted upon rollers 35 suitably supported in brackets 36 projecting from the frame of the well 13. In addition to the rollers 35 there are also provided idler rollers 37 and an adjusting roller 38 supported from a platform 39 which extends across the well 13 between the upper and lower runs of the belt. The roller 38 functions in the usual manner to take up the slack and keep the upper run of the belt as taut as is feasible. The roller 35 at the left side of the well, as shown in Fig. 2, is driven from the shaft 19 by a chain 40 which passes over a sprocket wheel 41 on the shaft of the roller 35 and a second sprocket wheel 42 on a stub shaft 43. The shaft 43 is driven from the shaft 19 by a pair of intermeshing beveled gears 44. By the mechanism thus described the belt 30 is actuated continuously during the operation of the conveyer mechanism.

The gravity feeding rolls are mounted in the bracket 36 at the right in Fig. 2 and of two types. The outer set of rolls 31ª are mounted on shafts carried by plates 45 supported from the side walls of the bracket 36 by straps 46 while the inner set of rolls 31ᵇ are mounted on shafts carried between the plates 45 and connected at the outer ends by plates 47. The rolls 31ª and 31ᵇ are freely rotatable and so located that they act as a gravity conveyer and any load placed thereon is automatically advanced by them toward the well 13. Mounted on the bracket 36 at the end of the belt 30 is a fixed stop consisting, as here shown, of spaced plates 48 which halts the advance of the load by the gravity rolls. Carried by the bracket 36 is an idle roller 49 extending in front of and forming a continuation of the upper run of the belt 30.

The bracket 36 is further supported by a frame 50 comprising vertical posts 51 and crossbars 52 and, on the upper crossbar, angle brackets 53. The raising or elevating belt 32 is mounted upon rollers 55 each suitably supported in a yoke 56. Each yoke 56 is secured at the upper end of a rod 57 which is mounted to reciprocate in suitable bearings 58 provided in the crossbars 52 of the frame 50. Each rod 57 is provided at its lower end with a roller 59 which bears at all times against the outer surface of a cam 60 carried by a shaft 61. The shaft 61 is mounted in journals 62 supported on beams 63 and is rotated by any suitable driving mechanism, being here shown as provided with a sprocket wheel 64 driven through a chain 65 from a motor 66.

The supply circuit to the motor 66 is controlled by a pair of circuit makers 67, 68 in series, each being of the usual construction and hence not described in detail other than to point out that each of them is provided with a switch arm 69 which is normally in an inoperative position but which is adapted under abnormal conditions to be tripped and to make the circuit. The circuit maker 67 is mounted upon one frame member of the well 13 with the switch arm 69 extending into the well so that it will contact with the carriers 12 on one chain 11 as they ascend for a purpose to be described later. The circuit maker 68 is mounted upon the frame 50 and its switch arm 69 rests against a finger 70 which projects into a position between and behind the line defined by the stops 48. When both circuit makers are in the functioning position, as will be pointed out later, the circuit is completed and the motor 66 is energized by means not here shown so that the belt 32 is elevated. Mounted upon the shaft 61 is a cam 72 which operates upon a circuit breaker, not shown, to break the circuit after each complete revolution of the shaft 61. At one end of the shaft 75 of the inner roller 55 is fixed a sprocket wheel 76 in alignment with a sprocket wheel 77 on the shaft of the adjacent roller 35 and connected thereto by a chain 78 so that the belt 32 is driven in unison with the belt 30.

The mechanism at the unloading station C comprises a delivery conveyer 80 and an ejector 81. The delivery conveyer 80 is mounted upon a pair of rollers 85, 86, the roller 85 being mounted upon a suitably located platform 87 and the roller 86 upon a frame 88 pivotally supported at one end upon the shaft of the roller 85 and suspended by hanger rods 89 from a cross beam 90 carried by uprights 91. The rods 89 are adjustable to determine the relation of the frame 88 to the well 13. Suitable guide walls 92 are provided at each side of the conveyer being supported in the frame 88 on which is also supported a floor 93 over which the conveyer passes.

The roller 86 is mounted below the upper run of the conveyer and an idle roller 94 is fixed in the frame at the end of the floor 93 over which the upper run of the conveyer passes. Thus the portion of the upper run between the roller 94 and the roller 86 is inclined upwardly away from the elevator well and at an angle to the downwardly inclined portion of the run between the roller 85 and the roller 94. The lower run of the conveyer passes over a pair of idler rollers 95 and under a weighted roll 96 which functions in the usual way to keep the upper run of the conveyer taut. Suitable means are provided by which conveyer 80 is caused to travel continually with the upper run proceeding away from the well as shown by the arrow in Fig. 6. Such means are preferably applied to the shaft 97 of the roller 85, in any well known manner. At the delivery end of the conveyor 80 is mounted a conveyor belt 100 passing at its forward end around a roller 101 between guide walls 102 which are secured to the guide walls 92 by straps 103 after the frame 88 has been positioned relative to the well 13 by means of the adjustable hanger rods 89. The frame 88 after being positioned is secured to the frame of the well by brackets (not shown) so that the frame and conveyer are rigidly fixed against transverse movement. The walls 92 preferably diverge adjacent the well 13 as is shown in Fig. 10.

The ejector 81 comprises a pair of arms 110 rigidly mounted on a shaft 111 supported in suitable bearings 112 on the frame of the well. The arms 110 are connected at their lower ends by a shaft 113 on which a roll 114 is mounted. A secondary connection 115 is also provided in order to insure that the arms 110 are properly spaced. Mounted on the shaft 111 between the bearings 112 at the right in Fig. 7 is an arm 120 which is connected by a link 121 to a reciprocable rod 122. The rod 122 is adapted to slide in bearings 123 mounted upon the frame of the well and carries at its upper end a roller 124, which at all times engages a cam 125 carried by one of the shafts 17, as shown in Figs. 7 and 8.

The roller 124 is mounted on a shaft 126 supported in a box 127 which is suitably secured to or may be integral with the rod 122. The box is open at the top and opposite ends and is provided with walls 128 intermediate and parallel to the side walls 129. The shaft 126 is carried by the walls 128 and the roller 124 projects from the top of the box. Mounted on shafts carried by the walls 128 and 129 are rollers 130 which project beyond the ends of the box as shown in Fig. 11. The rollers 130 bear against guide strips 131 attached by brackets 132 to the frame of the well so that the box 127 thus rides freely and follows the contour of the cam 125. For the purpose of insuring the contact of the roller 124 with the cam 125 there is mounted upon the shaft 111 between the bearings 112 at the left in Fig. 7 an arm 133 which carries a weight 134. The weight 134 plus the weight of the ejector arms 110 holds the roller 124 at all times in engagement with the cam 125.

The cam 125 is so constructed and positioned that the rod 122 will be depressed just at the time that a carrier 12 reaches the position shown in Fig. 7. The depression of the rod 122 by the cam 125 causes the arms 110 to swing from the full line position of Fig. 8 into the dotted line position thereof and accordingly moves the load from the carrier onto the delivery conveyer 80. Due to the inclination of the inner end of the conveyer 80 the forward edge of the case D forming the load is brought into engagement with the end of the belt as soon as it is shifted by the ejector arms 110 and as the arms continue to advance the case is moved up the incline by the arms and by the movement of the conveyer so that when the ejector arms have reached their final position the case is entirely supported by the conveyer and is quickly carried out of the well so that it will not engage the carriers 12.

The conveyer A moves continuously and in order to avoid any tendency of the chains 11 to retreat when the load is applied to the carrier I have provided a pair of brake arms 135, which at all times engage with the crossbars of the chains and prevent them from retreating. The brake arms 135 are carried by shaft 136 mounted in bearings 137 on the frame of the well whereby the shafts turn freely and the ends of the arms which are suitably formed as shown in Fig. 7 maintain their engagement with the chains.

The operation of the apparatus will now be described briefly. The vertical conveyer A is set in motion together with the belts 30 and 32 of the loading mechanism at station B and the delivery conveyer 80 at station C. A case D placed on the gravity conveyer formed by the rolls advances into contact with the plates 48 over the elevating belt 32. The case D upon engaging the plates 48 forces the finger 70 forward which causes the switch arm 69 to shift so that the circuit maker 68 closes its part of the circuit controlling the motor 66. As each carrier 12 on one pair of chains 11 passes the switch 69 it causes the circuit maker 67 to close its part of the same circuit. When the circuit maker 67 functions at the time when a case D causes the circuit maker 68 to function the motor 66 will be energized. The belt 32 will thereupon be elevated carrying the case D out of engagement with the stop plates 48 and finger 70 and advancing it onto the belt 30 by which it is positioned in the well 13. The carrier 12 next approaching the belt 30 engages the ends of the case with the portions 27 of the carrier flights and raises it to station C where it is acted upon by the ejector 81 and transferred onto the delivery conveyer 80. The conveyer 80 carries the case to the belt 100 by which it is transported to the desired destination.

Fig. 12 illustrates an embodiment of this invention wherein the vertical conveyer E is loaded at the upper station F and unloaded at the lower station G during the downward travel of the conveyer carriers.

The conveyer E comprises briefly two pairs of chains 140 which support flights 141 and which pass over sprockets 142 on the foot shafts 143 and sprockets 144 on the head shafts 145. The flights during their downward travel register so that each flight on one pair of chains forms, with a flight on the other pair of chains, a carrier which receives the load at station F, transports it to station G and delivers it. The head shafts 145 are preferably driven, as by a motor 146 supported upon a bracket 147 and acting directly upon one shaft 145. The shafts 145 are of course suitably connected so that they operate simultaneously.

The mechanism at the loading station F comprises feeding mechanism 150 which may be a chute, a gravity roll conveyer or any other suitable mechanism by which the load is conveyed to the main loading mechanism 151 which comprises two stationary sets of rolls 152 mounted on a frame 153 and located at either side of a raising or elevating belt 154. The end rollers 155 of the belt 154 are supported in yokes secured at the upper ends of rods 157. Each rod 157 is mounted to reciprocate in suitable bearings 158 on the frame 153 and is provided with a roller 159 which bears at all times against the outer surface of a cam 160 carried by a shaft 161. The shaft 161 is rotatably mounted in journal bearings 162 and driven by any suitable means such as the motor 163.

Fixed on the frame 153 at the forward end of the rolls 152 is a stop element 165 which may be of any desired form and which prevents the advance of each load on the rolls 152. Between the stop 165 and the conveyer E is located a traveling belt 166 supported upon end rollers 167 carried by the frame 153 and a pivoted frame 168. The frame 168 is pivotally supported at its outer end upon the frame 153 and is carried adjacent its inner end upon a rod 170 reciprocable through bearings 171 on the frame 153 and having at its lower end a roller 172 which bears at all times against the outer surface of a cam 173 carried by the shaft 161. The contour of the cam 173 is such that the inner end of the frame 168 descends in unison with the downward travel of each carrier. The belts 154 and 166 preferably travel in unison being suitably connected as by a chain or strap and driven by any suitable source of power. Circuit makers, not shown, but similar in construction and function to the circuit makers 67, 68 previously described with respect to the loading station B, are located in the circuit controlling the motor 163. Hence the motor 163 is actuated to raise the belt 154 and lower the frame 168 only when there is a load resting against the stop 165 and a carrier is approaching so that the load raised by the belt 154 will be transported by the belt 166 onto a carrier as it is descending. The carrier being loaded travels slightly ahead of the inner end of the frame 168 in order to insure proper loading.

The loads fed to the carriers at station F are removed therefrom at station G. The unloading mechanism here shown consists of a take-off belt of usual construction which extends across the conveyer well and is so located that the flights 141 pass at either side and deliver the load thereto. The belt 175 is supported upon end rolls 176 and is continually driven by any well known means (not shown) at such speed that each load is removed from the well before the next load arrives.

While two embodiments of this invention have been described I am not limited thereto since other embodiments may be made without departing from the spirit and scope of the invention as set forth in the following claims.

I claim:

1. The combination with a vertical conveyer adapted to receive a load at one station in its upward travel and to deliver the load at another station during such travel and comprising means vertically traveling in a well and carriers supported by such means and on which the load is transported, of mechanism at the loading station for feeding the loads to the carriers and comprising a belt, means actuating said belt, a stop at one end of said belt, means for feeding the load into contact with the stop, and means operable to raise the load above the stop whereby it is advanced onto the belt and transferred thereby to a carrier and means actuated conjointly by the conveyer and by the load for controlling the operation of the raising means.

2. The combination with a vertical conveyer adapted to receive a load at one station in its travel and to deliver the load at another station during its further travel in the same direction, and comprising means vertically traveling in a well and carriers supported by such means and on which the load is transported, of mechanism at the loading station for feeding the load to the carriers including a circuit maker controlled by the load to be fed, and a second circuit maker controlled by the vertical conveyer, and elevating means actuated in response to both circuit makers for advancing said load to a carrier of the vertical conveyer.

3. The combination with a vertical conveyer adapted to receive a load at one station in its travel and to deliver the load at another station during its further travel in the same direction and comprising means vertically traveling in a well and carriers supported by such means and on which the load is transported, of mechanism at the loading station for feeding the load to the carriers including a belt, a stop at one end of the belt, means for feeding the load into engagement with the stop, a circuit maker controlled by the load in engagement with the stop, a second circuit maker controlled by the vertical conveyer, and means actuated in response to both circuit makers for disengaging the load from the stop and advancing it onto the belt by which it is brought to a carrier of the vertical conveyer.

Signed by me at Syracuse, N. Y. this 19th day of February 1930.

LAVONT C. ALLEN.